United States Patent
Yamada et al.

(10) Patent No.: US 7,278,267 B2
(45) Date of Patent: Oct. 9, 2007

(54) STEAM TURBINE PLANT

(75) Inventors: Masahiko Yamada, Tokyo (JP); Katsuya Yamashita, Tokyo (JP); Koichi Goto, Kanagawa-ken (JP); Takao Nakagaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 143 days.

(21) Appl. No.: 11/062,757

(22) Filed: Feb. 23, 2005

(65) Prior Publication Data
US 2005/0229603 A1 Oct. 20, 2005

(30) Foreign Application Priority Data
Feb. 24, 2004 (JP) ............................. 2004-047939

(51) Int. Cl.
*F02C 3/30* (2006.01)
(52) U.S. Cl. ..................... 60/775; 60/39.52; 60/39.55
(58) Field of Classification Search ............... 60/39.3, 60/39.52, 39.53, 39.55, 775, 39.17
See application file for complete search history.

(56) References Cited

U.S. PATENT DOCUMENTS

| | | | | |
|---|---|---|---|---|
| 2,482,819 A | | 9/1949 | Williams | |
| 3,736,745 A | * | 6/1973 | Karig | 60/39.52 |
| 5,247,791 A | * | 9/1993 | Pak et al. | 60/39.55 |
| 5,953,900 A | * | 9/1999 | Bannister et al. | 60/775 |
| 6,170,264 B1 | * | 1/2001 | Viteri et al. | 60/671 |
| 6,263,568 B1 | | 7/2001 | Bannister et al. | |
| 2006/0021322 A1 | * | 2/2006 | Haberberger et al. | 60/39.55 |

FOREIGN PATENT DOCUMENTS

| | | |
|---|---|---|
| CN | 1211534 A | 3/1999 |
| EP | 0 884 099 A2 | 12/1998 |
| EP | 0 900 921 A2 | 3/1999 |
| JP | 02-130204 A | 5/1990 |
| JP | 09-273402 A | 10/1997 |

* cited by examiner

*Primary Examiner*—L. J. Casaregola
(74) *Attorney, Agent, or Firm*—Foley & Lardner LLP

(57) ABSTRACT

A steam turbine plant partially utilizes a hydrocarbon fuel such as an LNG as a fuel to improve the efficiency of the plant. A steam turbine plant includes a boiler, a steam turbine, a feedwater system, and a superheating combustor. The boiler generates steam, and the steam turbine is driven by the steam generated in the boiler. The feedwater system recovers the steam exhausted from the steam turbine and supplies the steam to the boiler as a feedwater. The superheating combustor is provided between the boiler and the steam turbine, wherein fuel originated from hydrocarbon fuel and oxidizer are mixed with the steam generated in the boiler and combusted in the superheating combustor to increase the temperature of the steam.

23 Claims, 6 Drawing Sheets

STEAM TURBINE PLANT

CROSS REFERENCE TO RELATED APPLICATION

This application is based upon and claims the benefit of priority from prior Japanese Patent Application No. 2004-47939 filed on Feb. 24, 2004, the entire contents of which are incorporated herein by reference.

FIELD OF THE INVENTION

This invention relates to a steam turbine plant, and in particular a steam turbine plant that can improve the efficiency of the plant.

DESCRIPTION OF THE BACKGROUND

With regard to a thermal power plant, one factor to improve thermal efficiency of the plant is a choice of a fuel used in the plant.

A combined cycle plant is a thermal power plant that combines a gas turbine and a steam turbine. Conventional combined cycle plants use liquefied natural gas (referred to as LNG), which contains very few impurities, as a fuel and achieves over 50% net generating efficiency.

The combined cycle plant can achieve high thermal efficiency, as mentioned above, because of its nature, which is a combination of a gas turbine and a steam turbine. However, because it utilizes a gas turbine, the fuel has to be clean to avoid trouble with turbine components which might be caused by impurities contained in the fuel.

On the other hand, coal is a more readily available fuel for the thermal power plant. It is said that coal is more abundant on earth than LNG However, coal usually contains many impurities and conventionally, is not suitable for a fuel in the gas turbine or the combined cycle plant.

Some pilot plants were made to utilize coal as a fuel for the combined cycle plant by using a technology of coal gasification. Such combined plant operates according to an IGCC (Integrated Gasification Combined Cycle). However, so far, net generation efficiency of the IGCC plant is just above 40%. So, still there is a room for development for the IGCC plant.

A conventional coal thermal power plant, which is a thermal power plant utilizing coal, typically uses pulverized coal as a fuel for combustion in a boiler of the plant. The boiler generates steam, and the steam drives a steam turbine and a generator, in the plant. This type of heat engine operates according to a Rankine cycle.

A schematic diagram of the conventional coal thermal power plant as described above is shown in FIG. 6, where numeric 1 is a boiler, 2 is a steam turbine, and 3 is a feedwater system. As shown in FIG. 6, boiler 1, steam turbine 2, and feedwater system 3 operates according to a Rankine cycle.

Boiler 1 includes a steam generator 4, and reheater 5. Coal 6, which is usually pulverized coal, is introduced in boiler 1 and is combusted to produce combustion gas. Steam is generated in the steam generator 4 and reheater 5 by the heat of the combustion gas.

Steam turbine 2 includes a high pressure turbine 8, an intermediate pressure turbine 9, a low pressure turbine 10, and a generator 11. The rotation shaft of the high pressure turbine 8, intermediate pressure turbine 9, low pressure turbine 10, and generator 11 are coupled to one another. The steam generated in steam generator 4, its flow rate controlled by a steam valve 12, is introduced into high pressure turbine 8. The steam flows inside high pressure turbine 8 and generates work as it expands.

The steam exhausted from high pressure turbine 8 returns to boiler 1 in reheater 5 and is reheated as a reheated steam. The reheated steam is then introduced to intermediate pressure turbine 9 to expand and generate work. The steam from intermediate pressure turbine 9 is introduced to low pressure turbine 10 further expand and generate work. The work generated at turbines 8, 9 and 10 drive generator 11.

Feedwater system 3 includes a condenser 13 and a feedwater pump 14. The steam exhausted from low pressure turbine 10 in steam turbine 2 is introduced into condenser 13. The steam condenses in condenser 13 into water as condensed water. Feedwater pump 14 pumps up the condensed water from condenser 13 as feedwater, which is fed to steam generator 4 in boiler 1.

Some modifications for these conventional steam turbine plants, such as hydrogen utilization, have been attempted because of relatively low thermal efficiency of the conventional coal thermal power plant.

Japanese patent publication (Kokai) No. 2-130204 describes an example of modified coal thermal power plant which utilizes hydrogen. In this example, high temperature steam produced by combustion of hydrogen with oxygen is mixed up with steam generated in a boiler to raise the temperature of the steam introduced to the turbine. In this case, inlet steam temperature is about 1470 degrees Fahrenheit, which is obtained by mixing the high temperature steam resulted form combustion of hydrogen with the steam generated in the boiler, whose temperature is about 1100 degrees Fahrenheit.

In general, the higher temperature steam introduced to the steam turbine, the higher thermal efficiency can be achieved with regard to a steam turbine cycle, which is also referred to as a Rankine cycle. However, the highest inlet steam temperature for existing steam turbines in practical use is about 1,150 degrees Fahrenheit because of the heat resisting property of material used in the boiler and the steam turbine.

So far, the cost to produce hydrogen is too high even in view of the improvement in thermal efficiency. Therefore, this kind of modified conventional steam turbine plant has not been in practical use.

SUMMARY OF THE INVENTION

Accordingly, an advantage of an aspect of the present invention is to provide a steam turbine plant that partially utilizes a hydrocarbon fuel such as an LNG as a fuel to improve the efficiency of the plant.

To achieve the above advantage, one aspect of the present invention is to provide a steam turbine plant that comprises a boiler that generates steam, a steam turbine driven by the steam generated in the boiler, a feedwater system that recovers the steam exhausted from the steam turbine and supplies the steam to the boiler as feedwater, and a superheating combustor provided between the boiler and the steam turbine, wherein fuel originated from a hydrocarbon fuel and an oxidizer are mixed with the steam generated in the boiler and combusted in the superheating combustor to increase the temperature of the steam.

Further features, aspects and advantages of the present invention will become apparent from the detailed description of preferred embodiments that follows, when considered together with the accompanying figures.

DETAILED DESCRIPTION OF THE PREFERRED EMBODIMENTS

Figure 1:
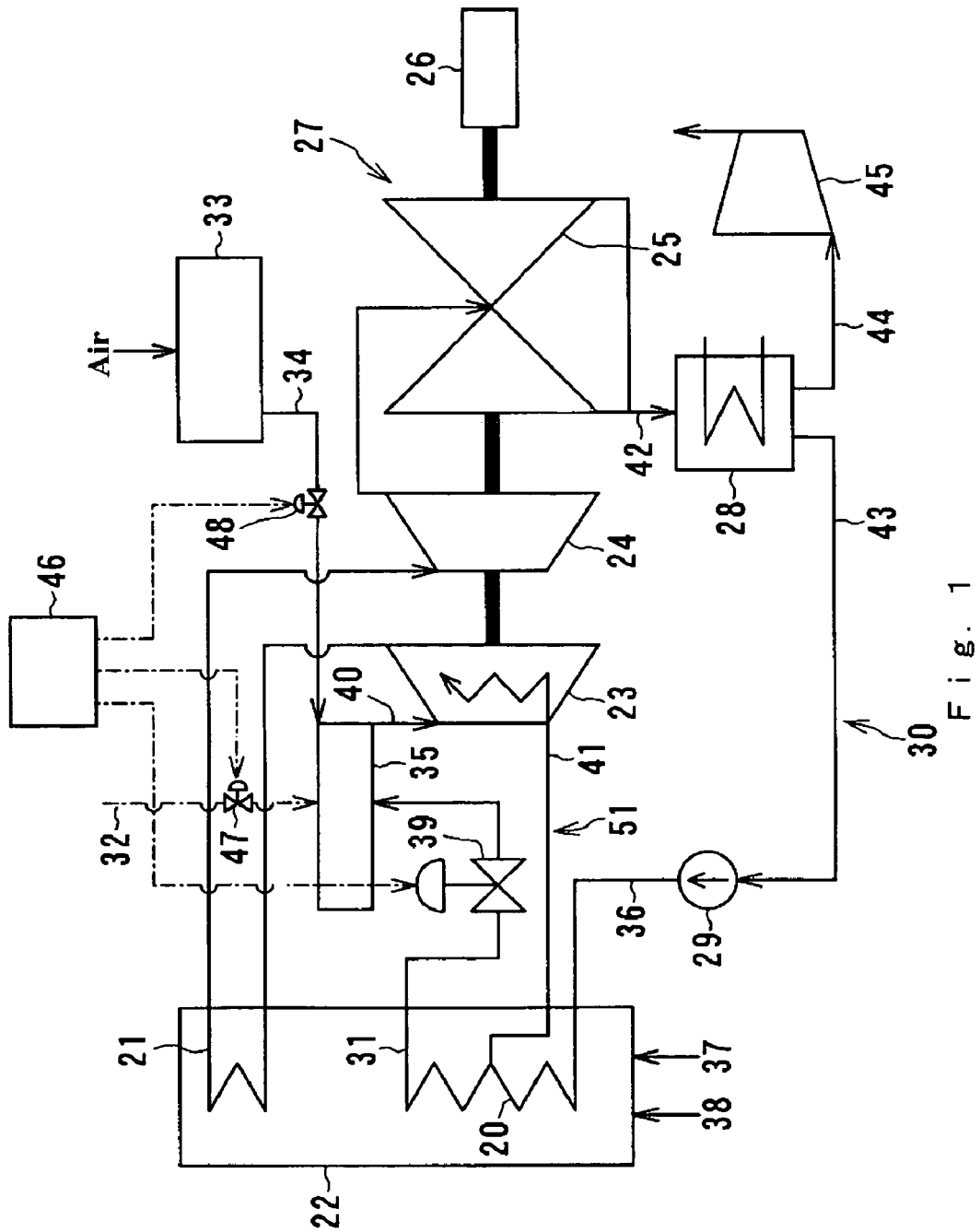
FIG. 1 is a schematic diagram of a first embodiment of a steam turbine plant in the present invention.

FIG. 1 is a schematic diagram of a first embodiment of a steam turbine plant in accordance with the present invention.

The steam turbine plant in accordance with the first embodiment comprises a boiler 22, a steam turbine 27, a feedwater system 30, and a superheating combustor 35. Boiler 22 includes a steam generator 20 and a reheater 21. Steam turbine 27 includes a high pressure turbine 23, an intermediate pressure turbine 24, and a low pressure turbine 25. The rotation shaft of high pressure turbine 23, intermediate pressure turbine 24, low pressure turbine 25 are coupled together as one and connected to a generator 26.

Feedwater system 30 includes a condenser 28, a condensate line 43, a feedwater pump 29, and a feedwater line 36. The feedwater system recovers steam from the low pressure turbine 25. The steam from the low pressure turbine condenses into water as condensate in the condenser 28 and led to the feedwater line 36 through condensate line 43 and feedwater pump 29.

The steam generator 20 in the boiler 22 generates high temperature steam 31 by feedwater supplied via feedwater line 36. Coal 37 as a fuel and air 38 are supplied to the boiler The high temperature steam 31 is supplied to the superheating combustor 35 via a steam valve 39. To the superheating combustor, hydrocarbon fuel 32 as fuel and oxygen 34 as an oxidizer are also supplied via a fuel valve 47 and an oxidizer valve 48, respectively. Oxygen 34 is separated from the air in a air separator 33. The steam turbine plant also comprises a controller 46, which controls valve lifts of steam valve 39, fuel valve 47, and oxidizer valve 48 to adjust flow rates of the high temperature steam 31, the hydrocarbon fuel 32 and the oxygen 34 so that it can meet the load demand. Controller 46 may be a PID controller, mechanical controller, or any other controller which is well known in the art.

In the superheating combustor 35, the hydrocarbon fuel 32 and the oxygen 34 are mixed with the high temperature steam 31 and combusted as super high temperature steam 40. The super high temperature steam 40 includes combustion gas other than the steam caused by combustion.

The super high temperature steam 40, whose temperature is increased to about 1,650 degrees Fahrenheit in this embodiment, is introduced to the high pressure turbine 23 in the steam turbine 27. Super high temperature steam 40 flows inside and drives the high pressure turbine 23 while it expands as a high pressure turbine exhaust. A cooling steam supply line 51 is provided to connect the steam generator 20 of the boiler 22 and the high pressure turbine 23 of the steam turbine 27 so as to supply steam bled from the steam generator 20 to the high pressure turbine as cooling steam 41. Cooling steam 41 is supplied to turbine parts which have a high temperature, such as the turbine rotor, turbine blades, or turbine casings, and cools those parts. Cooling steam 41, after cooled high temperature turbine parts, is mixed with the super high temperature steam introduced to the high pressure turbine 23. The high pressure turbine exhaust is then introduced to the reheater 21 in the boiler 22. The high pressure turbine exhaust is heated in the reheater 21 as reheated steam and supplied to the intermediate pressure turbine 24 in the steam turbine 27. Intermediate pressure turbine 24 is driven by the reheated steam flowing and expanding inside the intermediate pressure turbine 24. Exhaust steam from intermediate pressure turbine 24 is introduced into low pressure turbine 25 and further expands inside low pressure turbine 25. Thus high pressure turbine 23, intermediate pressure turbine 24 and low pressure turbine 25 of steam turbine 27 are driven by the steam, and therefore generator 26 is also driven.

Turbine discharge gas 42, which is the steam expanded in the steam turbine 27 and exhausted from the low pressure turbine 25 of steam turbine 27, is fed to condenser 28 where steam condenses into water as condensate. As explained above, the steam flowing inside the steam turbine 27 includes a small amount of noncondensing gas 44, such as the combustion gas other than steam caused by the combustion in the superheating combustor 35. Noncondensing gas 44 is extracted and separated from condenser 28 into a compressor 45. Compressor 45 compresses the noncondensing gas 44 to atmospheric pressure and discharge it to the atmosphere.

As described above, the steam turbine plant in accordance with the embodiment of the present invention includes the superheating combustor 35 provided between the steam generator 20 of the boiler 22 and the high pressure steam turbine 23 of the steam turbine 27. The superheating combustor 35 further heats up the temperature of the high temperature steam 31 generated in the steam generator 20 by combusting the hydrocarbon fuel 32 as the fuel with oxygen 34 as the oxidizer, which have their flow rates adjusted appropriately by the controller 46 in accordance with the load. This improves the heat efficiency of the plant.

Generally, the temperature of the steam introduced to the steam turbine is limited up to about 1,100 degrees Fahrenheit because of restrictions of the heat resisting property of the steam generator, especially tubes of the heat exchanger in the steam generator, tubes in the boiler or other parts in the steam turbine. However, in this embodiment, the boiler 22 generates steam at the same temperature as a conventional boiler because the superheating combustor 35, which is located at a downstream side of the boiler 22, heats up the temperature of the steam to about 1,650 degrees Fahrenheit. Furthermore, the high pressure turbine 23 may be operable with the super high temperature steam 40, which is supplied from the superheating combustor 35 to the high pressure turbine 23 at about 1,650 degrees Fahrenheit, because the parts exposed in the super high temperature steam 40 in the high pressure turbine 23, or other high temperature turbine parts are cooled down by the cooling steam 41 supplied from the steam generator 20 in the boiler 22 via the cooling steam supply line 51. The temperature of the cooling steam 41 supplied to the high pressure turbine 23 may be set appropriately by determining the point where the cooling steam 41 is bled from the steam generator 20 of the boiler 22.

However, the steam valve 39, which controls the flow rate of the high temperature steam 31 generated from steam generator 20, is placed at an upstream side of the superheating combustor 35, instead of at between the superheating combustor 35 and the high pressure steam turbine 23, to avoid the steam valve 39 from being exposed the super high temperature steam 40. This is mainly because presently there is no steam valve which has a heat resisting property sufficient to withstand long exposure to corresponding to the super high temperature steam 40. The steam valve 39 may be placed at between the superheating combustor 35 and the high pressure steam turbine 23 though the life of the steam valve 39 may be shortened. However same life of the steam valve as in the conventional steam turbine plant may be expected for the steam valve 39 when it is provided at an upstream side of the superheating combustor 35. The amount of super high temperature steam 40 supplied to the high pressure turbine may estimated by flow rates of the steam generated in the steam generator, and flow rates of the hydrocarbon fuel 32, and oxygen 34.

Oxygen 34, as the oxidizer, is separated and extracted from the air in the air separator 33. The air separator 33 helps to reduce the production of the noncondensing gas 44. As mentioned, noncondensing gas 44, which is combustion gas other than steam caused by combustion in the superheating combustor 35, is extracted and separated from the condenser 28 into the compressor 45. When compressing the noncondensing gas 44 in the compressor 45, power generated in the plant is used. Thus, when using oxygen 34, rather than air, as the oxidizer, the power used to extract and separate the noncondensing gas 44 from the turbine discharge gas 42 may be reduced and a total plant efficiency may be improved. Further, since the amount of the noncondensing gas is reduced, the condenser 28 may be relatively small compared when using the air as the oxidizer.

The fuel utilized in the superheating combustor 35, which is provided between the steam generator 20 of the boiler 22 and the high pressure steam turbine 23 of the steam turbine 27, should not contain ash content because the combustion gas is introduced to the steam turbine 27. Thus, the fuel used in the superheating combustor 35 is preferably clean fuel such as the hydrocarbon fuel 32 like LNG. However, the hydrocarbon fuel 32 such as LNG is relatively expensive compared to coal. There is a trade-off relationship between the plant efficiency and fuel cost. When a larger amount of the hydrocarbon fuel 32 used in the superheating combustor, the plant is operated at a high efficiency but is less cost effective.

Figure 2:
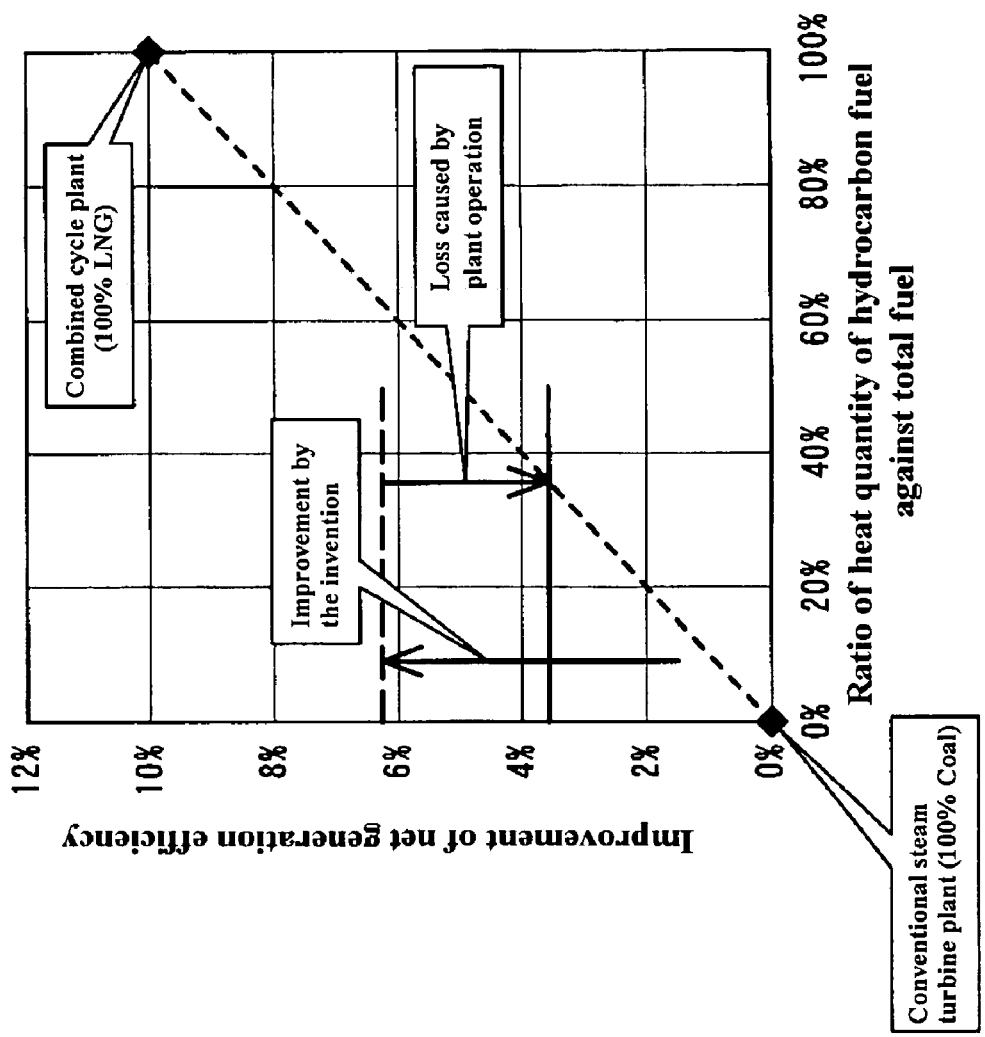
FIG. 2 is an estimated efficiency graph that shows the relationship regarding a rate of the hydrocarbon fuel.

FIG. 2 is an estimated efficiency graph that shows the relationship between a rate of the hydrocarbon fuel and improvement of net generation efficiency.

The horizontal axis indicates a ratio of hydrocarbon fuel heat quantity against a total amount of fuel heat quantity, which means hydrocarbon fuel used in the superheating combustor 35 and coal used in the boiler 22. The vertical axis indicates the improvement of the net generation efficiency with regard to the net generation efficiency of the conventional steam turbine plant that utilizes coal as a fuel for the boiler.

A dotted line connects two points, which represent the conventional steam turbine plant that only utilizes coal as a fuel and the combined cycle plant that only utilizes LNG as a fuel, respectively. As shown in FIG. 2, the efficiency of the combined cycle plant is 10 percent or more higher than that of conventional steam turbine plant.

It is estimated that the steam turbine plant in this embodiment achieves 6 percent higher net generating efficiency than the conventional steam turbine. However, it is also estimated that the power corresponds to 2 percent of the improved efficiency is used for operating the plant, such as separating and extracting oxygen from the air, compressing noncondensing gas or so on. Thus, it is estimated that an improvement of the net generating efficiency of the steam turbine plant in this embodiment is substantially 4 percent of the conventional steam turbine.

Therefore, as a non-limiting example, when the hydrocarbon fuel 32 is used in the plant with a ratio up to about 40 percent of the total heat quantity of the hydrocarbon fuel 32 and the coal supplied to the boiler 22, the plant may achieve the higher efficiency than a hypothetical plant that simply combines the conventional steam turbine plant and the combined cycle plant represented by the dotted line in FIG. 2.

In this embodiment, this may be easily accomplished by using the controller 46, which controls the steam valve 39, fuel valve 47, and oxidizer valve 48 to adjust flow rates of the high temperature steam 31, the hydrocarbon fuel 32 and the oxygen 34 in accordance with the load demand. The controller 46 may be configured to detect the quantity of coal 37 and hydrocarbon fuel 32 to estimate and limit the quantity of hydrocarbon fuel 32 by controller 46 up to 40 percent of a total heat quantity of the fuel and the coal utilized in the plant.

The controller 46 also has a function to keep the temperature of the super high temperature steam 40, which is introduced to the high pressure turbine 23, constantly at about 1,650 degrees Fahrenheit.

The controller 46 sends signals to the steam valve 39, fuel valve 47, and oxidizer valve 48 in accordance with the load demand to adjust the flow rate of the high temperature steam 31, the hydrocarbon fuel 32, and the oxygen 34 which are introduced to the superheating combustor 35. Thus, when the flow rate of the high temperature steam 31, the hydrocarbon fuel 32, and the oxygen 34 are appropriately adjusted, the temperature of the super high temperature steam 40 is kept at about 1,650 degrees Fahrenheit.

With regard to the pressure of the super high temperature steam 40, it is preferably set about 16 MPa, assuming that the wetness of the steam introduced to the condenser from the low pressure turbine 25 is 10 percent.

As explained above, according to the embodiment in accordance with this invention, the superheating combustor 35 generates the super high temperature steam 40 in about 1,650 degrees Fahrenheit, and the thermal efficiency of the plant may be improved compared to the conventional steam turbine.

Figure 3:
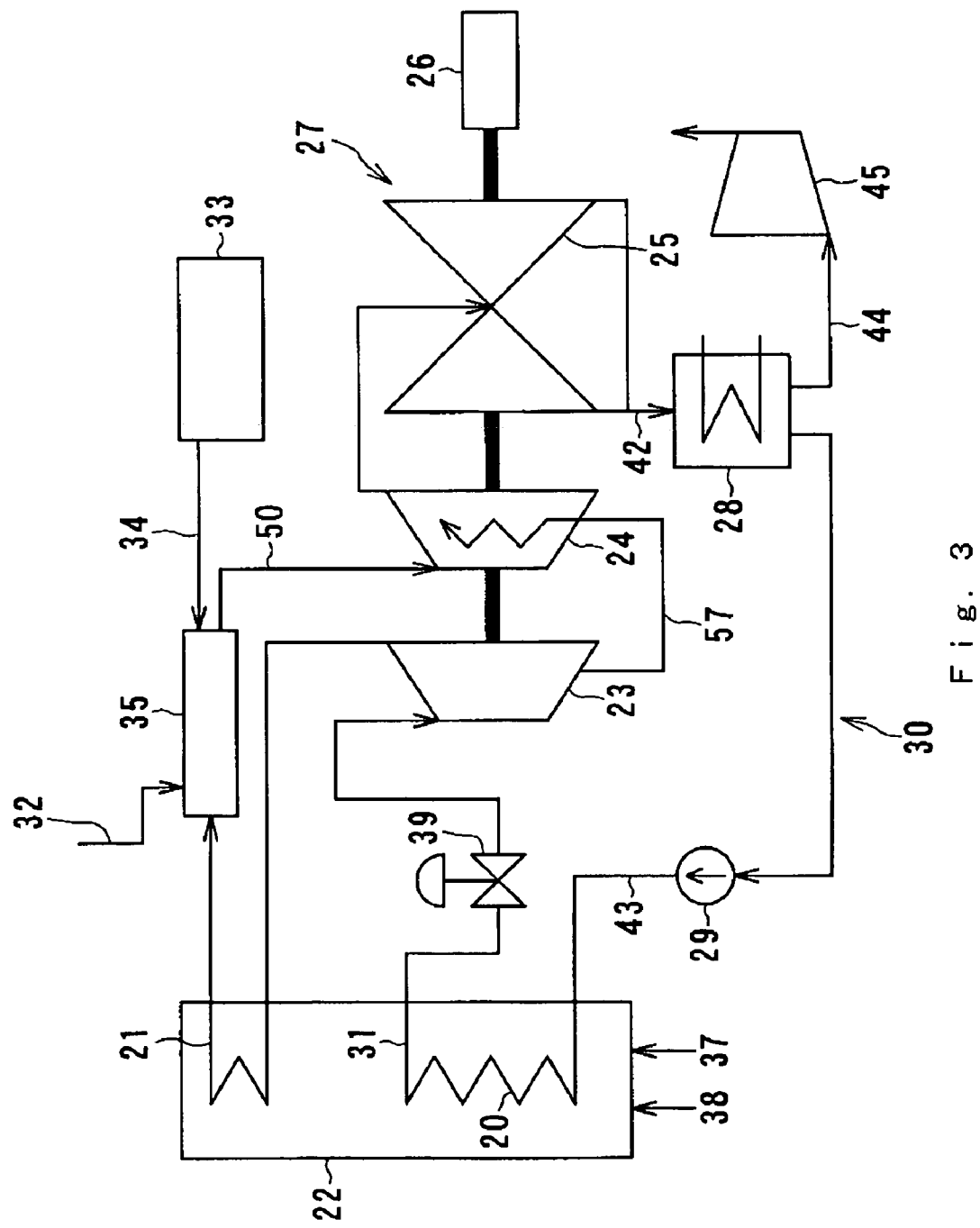
FIG. 3 is a schematic diagram of a modification of the first embodiment of a steam turbine plant.

FIG. 3 is a schematic diagram of a modification of the first embodiment of a steam turbine plant in accordance with the present invention. The same symbols are used for the same elements as in the first embodiment. A detailed descriptions of some elements in this embodiment are omitted since those elements are the same as the first embodiment.

In this modification, the superheating combustor 35 is provided between the reheater 21 of the boiler 22 and the intermediate pressure turbine 24 of the steam turbine 27, instead of at between the steam generator 20 and high pressure steam turbine 23 in the FIG. 1.

The high pressure steam turbine 23 is driven by high temperature steam 31. The high pressure turbine exhaust, which is the steam discharged from the high pressure turbine 23, is heated in the reheater 21 as reheated steam. The reheated steam then introduced to the superheating combustor 35. The reheated steam is mixed with hydrocarbon fuel 32 and oxygen 34 and combusted as super high temperature reheated steam 50 in the superheating combustor 35. The super high temperature reheated steam 50 is introduced to the intermediate pressure turbine 24 to drive the intermediate pressure turbine 24.

Because the super high temperature reheated steam 50 is introduced to the intermediate pressure turbine 24, it is necessary to cool parts of the intermediate pressure turbine 24. Therefore, a cooling steam supply line 57 are provided. In this modification, the cooling steam supply line 57 connects between the high pressure steam turbine 23 and the intermediate pressure turbine 24 and bleeds the steam, which flows inside the high pressure turbine 23, from the high pressure turbine 23 as cooling steam. The temperature of the cooling steam supplied to the intermediate pressure turbine 24 may be set appropriately by determining the point where the cooling steam is bled from the high pressure turbine 23. The cooling steam supply line 57 may be provided between the boiler 22 and the intermediate pressure turbine 24, like the cooling steam supply line 51 shown in FIG. 1, to bleed and supply the cooling steam from the boiler 22. This modification may also improve the thermal efficiency of the plant.

Figure 4:
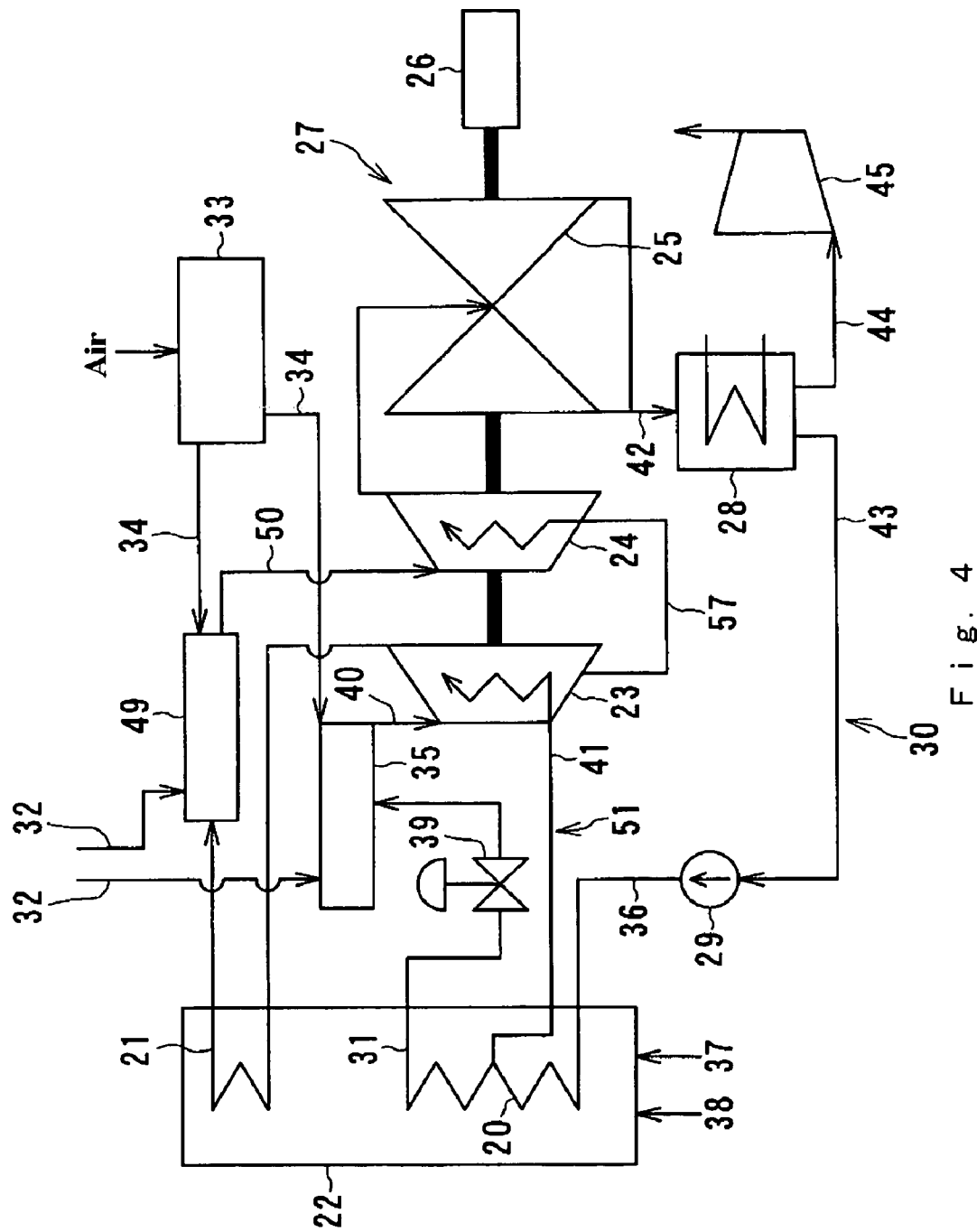
FIG. 4 is a schematic diagram of a second embodiment of a steam turbine plant in the present invention.

FIG. 4 is a schematic diagram of a second embodiment of a steam turbine plant in accordance with the present invention. The same symbols are used for the same elements as in the first embodiment. A detailed descriptions of some elements in this embodiment are omitted since those elements are the same as the first embodiment.

In this embodiment, the steam turbine plant comprises two superheating combustors, a first superheating combustor 35 and a second superheating combustor 49. In other words, the superheating combustor includes the first superheating combustor and the second superheating combustor. Both superheating combustors 35, 49 are placed between the boiler 22 and the steam turbine 27, however the second superheating combustor 49 is provided between the reheater 21 of the boiler 22 and the intermediate pressure turbine 24 of the steam turbine 27 while the first superheating combustor 35 is provided between the steam generator 20 of the boiler 22 and the high pressure steam turbine 23 of the steam turbine 27.

The high pressure turbine exhaust, which is the steam discharged from the high pressure turbine 23, is heated in the reheater 21 as reheated steam. The reheated steam then introduced to the second superheating combustor 49. In the second superheating combustor 49, the reheated steam is mixed with hydrocarbon fuel 32 and oxygen 34 and combusted as super high temperature reheated steam 50. The super high temperature reheated steam 50 is introduced to the intermediate pressure turbine 24 to drive the intermediate pressure turbine 24.

Because the super high temperature reheated steam 50 is introduced to the intermediate pressure turbine 24, it is necessary to cool parts of the intermediate pressure turbine 24. Therefore, a cooling steam supply line 57 is provided. In this embodiment, the cooling steam supply line 57 connects between the high pressure steam turbine 23 and the intermediate pressure turbine 24 and bleeds the steam, which flows inside the high pressure turbine 23, from the high pressure turbine 23 as cooling steam. The temperature of the cooling steam supplied to the intermediate pressure turbine 24 may be set appropriately by determining the point where the cooling steam is bled from the high pressure turbine 23. The cooling steam supply line 57 may be provided between the boiler 22 and the intermediate pressure turbine 24, like the cooling steam supply line 51 (FIG. 1), to bleed and supply the cooling steam from the boiler 22.

According to this embodiment, not only the steam supplied to the high pressure turbine 23, but also the steam supplied to the intermediate pressure turbine 24 is in the super high temperature, further improvement of the thermal efficiency is expected.

Figure 5:
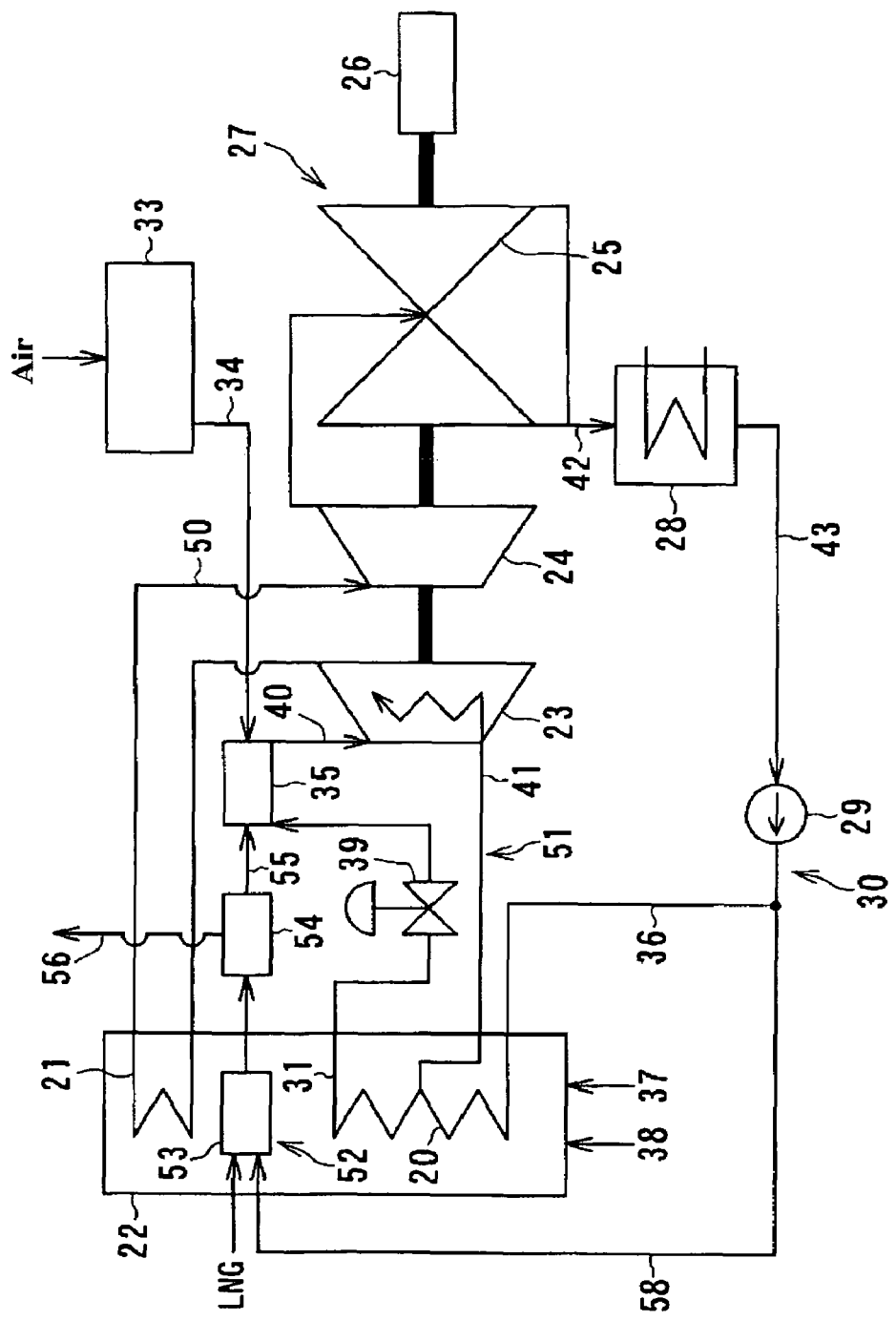
FIG. 5 is a schematic diagram of a third embodiment of a steam turbine plant in the present invention.
Figure 6:
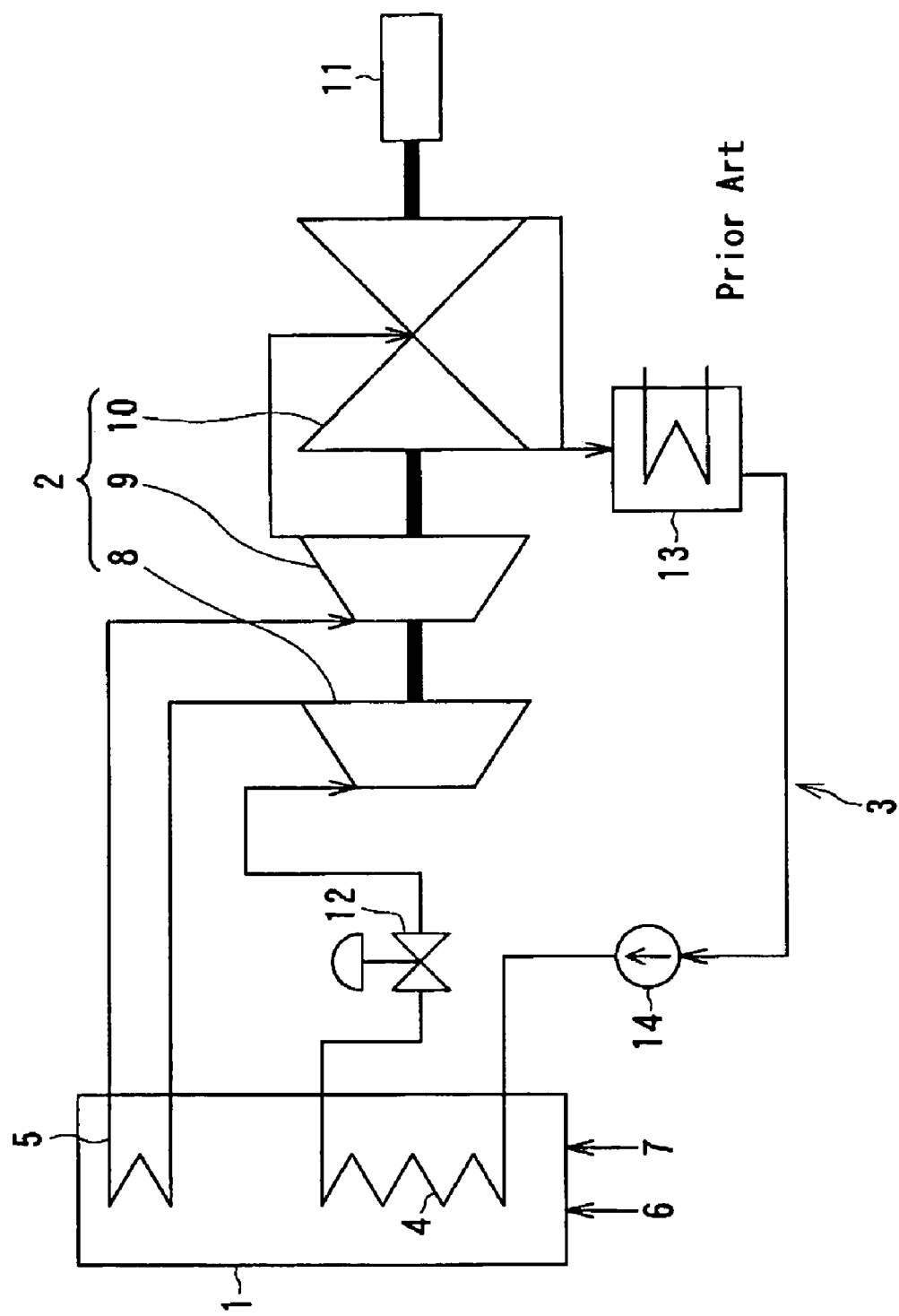
FIG. 6 is a schematic diagram of a conventional steam turbine plant.

FIG. 5 is a schematic diagram of a third embodiment of a steam turbine plant in accordance with the present invention. The same symbols are used for the same elements as the in first embodiment. A detailed descriptions of some elements in this embodiment are omitted since those elements are the same as the first embodiment.

In this embodiment, the superheating combustor 35 is supplied hydrogen rich gas 55, which is originated from hydrocarbon fuel, as fuel. And the plant comprises a fuel reforming device 52 for reforming the hydrocarbon fuel into hydrogen rich gas 55. As the fuel reforming device 52, a steam reformer 53, a carbon dioxide separator 54 and a reforming steam supply line 58 are provided in this embodiment.

The steam reformer 53 is provided in the boiler 22. The reforming steam supply line 58 connects between the feedwater line 36, which is connected at a downstream side of the feedwater pump 29, and the steam reformer 58 so as to supply high pressure water to the steam reformer 53. To the steam reformer 53, the hydrocarbon fuel such as an LNG is also supplied. The hydrocarbon fuel and the high pressure water reacts in the steam reformer 53 by utilizing the heat of the boiler 22, the hydrocarbon fuel is reformed as the hydrogen rich gas 55. The reaction formula of steam reforming of the hydrocarbon fuel is as below.

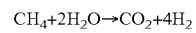

The reaction is endothermic reaction. In this embodiment, the heat necessary for the reaction can be taken from the heat of the boiler 22 by providing the steam reformer 53 in the boiler 22. Such an arrangement improves the efficiency of the plant.

The hydrogen rich gas 55 is supplied to the superheating combustor 35 after separating carbon dioxide in the carbon dioxide separator 54. Carbon dioxide separator 54 separates the carbon dioxide contained in the hydrogen rich gas 55 supplied from the steam reformer 53.

According to this embodiment, the super high temperature steam 40 introduced to the steam turbine contains less impurities because the fuel used in the superheating combustor 35 is hydrogen rich gas 55. This may improve the thermal efficiency and may extend the life of the steam turbine 27. Further, the condenser 28 may be a compact one because the noncondensing gas contained in the operative gas is smaller.

This embodiment may be combined with modification of the first embodiment shown in FIG. 3, or the second embodiment shown in FIG. 4.

Other embodiments of the present invention will be apparent to those skilled in the art from consideration of the specification and practice of the invention disclosed herein. It is intended that the specification and example embodiments be considered as exemplary only, with a true scope and spirit of the invention being indicated by the following.

What is claimed is:

1. A steam turbine plant, comprising:
   a boiler that generates steam,
      wherein the boiler utilizes coal to generate the steam;
   a steam turbine driven by the steam generated in the boiler;
   a feedwater system that recovers the steam exhausted from the steam turbine and supplies the steam to the boiler as feedwater;

a superheating combustor provided between the boiler and the steam turbine,
  wherein fuel originated from a hydrocarbon fuel and an oxidizer are mixed with the steam generated in the boiler and combusted in the superheating combustor to increase the temperature of the steam; and
a fuel controller which controls a quantity of heat of the hydrocarbon fuel up to about 40 percent of a total heat quantity of the fuel and the coal utilized in the plant.

2. A steam turbine plant according to claim 1, wherein the oxidizer is oxygen.

3. A steam turbine plant according to claim 2, further comprising:
an air separator that extracts the oxygen from air.

4. A steam turbine plant according to claim 1, further comprising:
a fuel reforming means for making hydrogen rich gas from the hydrocarbon fuel.

5. A steam turbine plant according to claim 1, further comprising:
a steam reformer, which makes the hydrocarbon fuel for the superheating combustor, the steam reformer provided in the boiler; and
a carbon dioxide separator provided between the steam reformer and the superheating combustor.

6. A steam turbine plant according to claim 5, further comprising:
a reforming steam supply line connecting between the feedwater system and the steam reformer.

7. A steam turbine plant, comprising:
a boiler that generates steam;
a steam turbine driven by the steam generated in the boiler;
a feedwater system that recovers the steam exhausted from the steam turbine and supplies the steam to the boiler as feedwater, wherein the feedwater system includes a steam condenser connected to the steam turbine;
a superheating combustor provided between the boiler and the steam turbine,
  wherein fuel originated from a hydrocarbon fuel and an oxidizer are mixed with the steam generated in the boiler and combusted in the superheating combustor to increase the temperature of the steam; and
a compressor coupled with the steam condenser which separates noncondensing gas from the steam condenser.

8. A steam turbine plant according to claim 1, further comprising:
a steam valve which adjusts an amount of the steam supplied to the superheating combustor.

9. A steam turbine plant according to claim 8, further comprising:
a fuel valve which adjusts an amount of the fuel supplied to the superheating combustor;
a oxidizer valve which adjusts an amount of the oxidizer supplied to the superheating combustor; and
a flow controller coupled with the steam valve, the fuel valve and the oxidizer valve.

10. A steam turbine plant according to claim 1, further comprising:
a cooling steam supplying line connecting between the boiler and the steam turbine, which bleeds steam from the boiler as cooling steam and supplies the cooling steam to the steam turbine.

11. A steam turbine plant according to claim 1, wherein;
the boiler includes a steam generator and a reheater,
the steam turbine includes a high pressure turbine, an intermediate pressure turbine and a low pressure turbine, and
the superheating combustor is provided between the reheater and the intermediate pressure turbine.

12. A steam turbine plant according to claim 11, further comprising:
a fuel reforming device for making hydrogen rich gas from the the hydrocarbon fuel.

13. A steam turbine plant according to claim 11, further comprising:
a steam reformer, which makes the hydrocarbon fuel for the superheating combustor, the steam reformer provided in the boiler; and
a carbon dioxide separator provided between the steam reformer and the superheating combustor.

14. A steam turbine plant according to claim 13, further comprising:
a reforming steam supply line connecting between the feedwater system and the steam reformer.

15. A steam turbine plant according to claim 11, further comprising:
a cooling steam supplying line connecting between the boiler and the intermediate pressure turbine of the steam turbine, which bleeds steam from the boiler as a cooling steam and supplies the cooling steam to the intermediate pressure turbine of the steam turbine.

16. A steam turbine plant according to claim 11, further comprising:
a cooling steam supplying line connecting between the high pressure turbine and the intermediate pressure turbine of the steam turbine, which bleeds steam from the high pressure turbine as cooling steam and supplies the cooling steam to the intermediate pressure turbine of the steam turbine.

17. A steam turbine plant according to claim 1, wherein;
the boiler includes a steam generator and a reheater,
the steam turbine includes a high pressure turbine, an intermediate pressure turbine and a low pressure turbine,
the superheating combustor includes a first superheating combustor provided between the steam generator and the high pressure turbine and a second superheating combustor provided between the reheater and the intermediate pressure turbine.

18. A steam turbine plant according to claim 17, further comprising:
a fuel reforming device for making hydrogen rich gas from the hydrocarbon fuel.

19. A steam turbine plant according to claim 17, further comprising:
a steam reformer, which makes the hydrocarbon fuel for the superheating combustor, the steam reformer provided in the boiler; and
a carbon dioxide separator provided between the steam reformer and the superheating combustor.

20. A steam turbine plant according to claim 19, further comprising:
a reforming steam supply line connecting between the feedwater system and the steam reformer.

21. A steam turbine plant according to claim 17, further comprising:
a cooling steam supplying line connecting between the boiler and at least one of the high pressure turbine or the intermediate pressure turbine of the steam turbine, which bleeds steam from the boiler as cooling steam and supplies the cooling steam to said at least one of the high pressure turbine or the intermediate pressure turbine of the steam turbine.

22. In a steam turbine plant having a boiler that generates steam, a steam turbine driven by the steam generated in the boiler which utilizes coal, a feedwater system that recovers the steam exhausted from the steam turbine and supplies the steam to the boiler as a feedwater; a method for operating said steam turbine plant comprising:

feeding said steam from said boiler to a superheating combustor;

feeding a hydrocarbon fuel and an oxidizer to said superheating combustor;

controlling a quantity of heat of the hydrocarbon fuel up to about 40 percent of a total heat quantity of the fuel and the coal utilized in the plant;

combusting said hydrocarbon fuel and said oxidizer in said superheating combustor with said steam from said boiler to produce super high temperature steam; and, feeding said super high temperature steam to said steam turbine.

23. In a steam turbine plant having a boiler that generates steam, a steam turbine driven by the steam generated in the boiler, a feedwater system that recovers the steam exhausted from the steam turbine and supplies the steam to the boiler as a feedwater; a method for operating said steam turbine plant comprising:

feeding said steam from said boiler to a superheating combustor;

feeding a hydrocarbon fuel and an oxidizer to said superheating combustor;

combusting said hydrocarbon fuel and said oxidizer in said superheating combustor with said steam from said boiler to produce super high temperature steam;

feeding said super high temperature steam to said steam turbine;

recovering the steam exhausted from the steam turbine in a steam condenser; and compressing noncondensing gas which is separated from the steam condenser.

\* \* \* \* \*